(12) United States Patent
Caiafa et al.

(10) Patent No.: US 8,861,681 B2
(45) Date of Patent: Oct. 14, 2014

(54) METHOD AND SYSTEM FOR ACTIVE RESONANT VOLTAGE SWITCHING

(75) Inventors: Antonio Caiafa, Niskayuna, NY (US); Peter Michael Edic, Albany, NY (US); Colin Richard Wilson, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 859 days.

(21) Appl. No.: 12/972,156

(22) Filed: Dec. 17, 2010

(65) Prior Publication Data

US 2012/0155613 A1   Jun. 21, 2012

(51) Int. Cl.
*H05G 1/32* (2006.01)
*H02M 7/10* (2006.01)
*H02M 3/337* (2006.01)
*H05G 1/10* (2006.01)
*H02M 1/00* (2006.01)

(52) U.S. Cl.
CPC ........ *H02M 7/10* (2013.01); *H02M 2001/0058* (2013.01); *H02M 3/337* (2013.01); *Y02B 70/1491* (2013.01); *H05G 1/10* (2013.01); *Y02B 70/1433* (2013.01)
USPC ................ 378/112; 378/5; 378/16; 378/98.9; 378/101; 378/103; 378/111

(58) Field of Classification Search
USPC ............... 378/91, 98.9, 98.11, 101, 103, 104, 378/105, 111, 112, 114, 115, 5, 16
See application file for complete search history.

(56) References Cited

U.S. PATENT DOCUMENTS

| | | | |
|---|---|---|---|
| 5,267,138 A * | 11/1993 | Shores ............................ | 363/98 |
| 5,661,774 A | 8/1997 | Gordon et al. | |
| 5,731,968 A * | 3/1998 | Van Der Broeck et al. .... | 363/71 |
| 6,072,856 A * | 6/2000 | Van Der Broeck et al. .. | 378/101 |
| 6,351,401 B1 * | 2/2002 | Scheel et al. ..................... | 363/98 |
| 6,477,062 B1 * | 11/2002 | Wagner et al. .................. | 363/17 |
| 6,891,927 B2 * | 5/2005 | Kitaoka ......................... | 378/103 |

(Continued)

OTHER PUBLICATIONS

Image Quality Optimization and Evaluation of Linearly Mixed Images in Dual-Source, Dual-Energy CT, Lifeng et al., Medical Physics journal, 2009.

(Continued)

*Primary Examiner* — Allen C. Ho
(74) *Attorney, Agent, or Firm* — Dean D. Small; The Small Patent Law Group

(57) ABSTRACT

Methods and systems for active resonant voltage switching are provided. One active resonant switching system includes a voltage switching system having one or more active resonant modules to provide a switching voltage output. Each of the resonant modules includes a plurality of switching devices configured to operate in open and closed states to produce first and second voltage level outputs from a voltage input. The resonant modules also include a capacitor connected to the switching devices and configured to receive a discharge energy during a resonant operating cycle when switching an output voltage from the first voltage level to the second voltage level, wherein the capacitor is further configured to restore system energy when switching from the second to first voltage level. The resonant modules further include a resonant inductor configured to transfer energy to and from the capacitor.

20 Claims, 13 Drawing Sheets

(56) References Cited

U.S. PATENT DOCUMENTS

| | | | |
|---|---|---|---|
| 6,917,531 B2* | 7/2005 | Scheel et al. | 363/97 |
| 7,298,812 B2 | 11/2007 | Tkaczyk et al. | |
| 7,327,827 B2* | 2/2008 | Sakamoto et al. | 378/103 |
| 7,400,708 B2* | 7/2008 | Takahashi et al. | 378/109 |
| 7,522,705 B2* | 4/2009 | Katcha et al. | 378/103 |
| 7,742,573 B2* | 6/2010 | Caiafa et al. | 378/111 |
| 7,844,030 B2* | 11/2010 | Wilson et al. | 378/111 |
| 8,189,741 B2* | 5/2012 | Ernest et al. | 378/103 |
| 8,441,812 B2* | 5/2013 | Ueno et al. | 363/21.02 |
| 2009/0245467 A1 | 10/2009 | Wilson et al. | |
| 2010/0098217 A1 | 4/2010 | Caiafa et al. | |
| 2012/0155614 A1* | 6/2012 | Caiafa et al. | 378/111 |

OTHER PUBLICATIONS

Image-Based Dual Energy CT Using Optimized Precorrection Functions: A Practical New Approach of Material Decomposition in Image Domain, Clemens et al., Medical Physics journal, 2009.

* cited by examiner

METHOD AND SYSTEM FOR ACTIVE RESONANT VOLTAGE SWITCHING

BACKGROUND OF THE INVENTION

The subject matter disclosed herein relates generally to voltage switching systems, and more particularly, to methods and apparatus for voltage switching in imaging systems, such as diagnostic x-ray imaging systems.

In conventional computed tomography (CT) x-ray imaging systems, an x-ray source emits a cone-shaped x-ray beam toward a subject or object, such as a patient or piece of luggage. The beam, after being attenuated by the subject, impinges upon an array of radiation detectors. The intensity of the attenuated beam radiation received at the detector array is dependent upon the attenuation of the x-ray beam by the subject. Each detector element of the detector array produces a separate electrical signal indicative of the x-ray intensity received by that particular detector element. The electrical signals are quantized and transmitted to a data processing system for analysis, which generally results in the presentation of an image.

CT imaging systems may comprise energy-discriminating (ED), multi-energy (ME), and/or dual-energy (DE) CT imaging systems that may be referred to as an EDCT, MECT, and/or DECT imaging system. The EDCT, MECT, and/or DECT imaging systems are configured to measure energy-sensitive projection data. The energy-sensitive projection data may be acquired using multiple applied x-ray spectra by modifying the operating voltage of the x-ray tube or utilizing x-ray beam filtering techniques (e.g., energy-sensitive x-ray generation techniques), or by energy-sensitive data acquisition by the detector using energy-discriminating, or with photon counting detectors or dual-layered detectors (e.g., energy-sensitive x-ray detection techniques).

With X-ray generation techniques, various system configurations utilize modification of the operating voltage of the x-ray tube including: (1) acquisition of projection data from two sequential scans of the object using different operating voltages of the x-ray tube, (2) acquisition of projection data utilizing rapid switching of the operating voltage of the x-ray tube to acquire low-energy and high-energy information for an alternating subset of projection views, or (3) concurrent acquisition of energy-sensitive information using multiple imaging systems with different operating voltages of the x-ray tube.

EDCT/MECT/DECT provides energy discrimination capability that allows material characterization. For example, in the absence of object scatter, the system utilizes signals from two applied photon spectra, namely the low-energy and the high-energy incident x-ray spectrum. The low-energy and high-energy incident x-ray spectra are typically characterized by the mean energies of the applied x-ray beams. For example, the low-energy x-ray spectrum comprises x-ray photons with lower-energy photons, resulting in a lower mean energy, relative to the high-energy x-ray spectrum. The detected signals from low-energy and high-energy x-ray spectra, either from two different applied spectra (x-ray generation techniques) or by regions of the same applied spectrum (x-ray detection techniques) provide sufficient information to estimate the effective atomic number of the material being imaged. Typically, x-ray attenuation mechanisms (Compton scattering or Photoelectric absorption) or the energy-sensitive attenuation properties of two basis materials (typically water and calcium for patient scanning) are used to enable estimation of the effective atomic number.

Dual-energy scanning can obtain diagnostic CT images that enhance contrast separation within the image by utilizing energy-sensitive measurements. To facilitate processing of the energy-sensitive measurements, the applied x-ray spectrum should be constant during an integration period. For example, such CT systems that acquire interleaved subsets of low-energy and high-energy projection data (versus two separate scans) should operate to maintain the accelerating voltage steady during an acquisition interval. Also, the change from one voltage level to another voltage level should occur very rapidly. Less stable x-ray tube operating voltages and/or slower operating voltage switching times result in a reduction in the difference in effective mean energy (the average of the mean energy of time-varying x-ray spectrum) of the applied x-ray spectra, which reduces the fidelity of the system in characterizing different materials.

Thus, while switching the x-ray tube potential (voltage), for example, by using high-frequency generators, may solve some of the problems related to conventional dual-energy scanning (acquiring energy-sensitive projection data on alternate scans of the object), such a configuration does not always provide the switching speed needed for certain imaging applications. For example, cardiac imaging cannot be effectively performed by simply switching the x-ray source potential between two sequential scans of the human thorax due to cardiac motion. Furthermore, for systems utilizing rapid switching of the x-ray potential for subsets of projection angles, the switching speed of the x-ray tube potential may not be sufficient for the fast gantry rotation speeds required to freeze motion for cardiac imaging. There is often a delay in the response time of the switched operating potential between the high frequency generator and the x-ray tube, due in part to the capacitance of the cable connecting the device and the x-ray tube.

The delay in response time is dependent on the x-ray beam current of the x-ray tube as the beam current also either helps or hinders the discharge of the associated system capacitance. Accordingly, the rise time in switching the generator from a first (low) voltage, or low kVp, level to a second (high) voltage, or high kVp, level is limited by the power of the high-voltage generator, which may be suboptimal for dual-energy imaging in many medical applications. Similarly, the fall time between switching the high kVp to a low kVp level is generally very slow due to the need to discharge the system capacitance, which effectively reduces the energy separation of the applied spectra, resulting in reduced material characterization sensitivity and, therefore, the effectiveness of the dual-energy imaging. As such, these insufficient switching speeds often lead to projection data pair inconsistencies resulting in streak artifacts in reconstructed images. Additionally, many industrial CT systems for baggage inspection utilize stationary anode tube configurations that have an x-ray beam current that is an order of magnitude or more lower than the x-ray beam current used with medical CT system employing rotating-anode technology. As such, the time required to switch the operating voltage of the x-ray tube is prohibitively long.

For radiographic x-ray imaging systems, the limitations mentioned above also apply. Radiographic x-ray systems acquire one or more views of the imaged object, which may be presented as two-dimensional projection images, or in some cases where several more projection data are acquired, as three-dimensional images generated using tomosynthesis techniques. The aforementioned limitations regarding switching speed apply to x-ray radiographic or tomosynthesis systems such as due to the capacitance of the high-voltage cable connecting the generator to the x-ray tube, the x-ray tube capacitance itself, the power of the generator, and the x-ray beam current that may limit switching speed.

BRIEF DESCRIPTION OF THE INVENTION

In accordance with various embodiments, a voltage switching system is provided that includes one or more active resonant modules connected to provide a switching voltage output. Each of the plurality of resonant modules includes a plurality of switching devices configured to operate in open and closed states to produce first and second voltage level outputs from a voltage input The plurality of resonant modules also includes a capacitor (e.g., an energy-store capacitor) connected to the pair of switching devices and configured to receive a discharge energy from the system capacitance during a resonant operating cycle when switching an output voltage from the first (e.g., high) voltage level to the second (e.g., low) voltage level, wherein the energy-storage capacitor is further configured to restore system energy when switching from the second voltage level to the first voltage level. The plurality of resonant modules further includes a resonant inductor configured to transfer energy to and from the energy-storage capacitor.

In accordance with other various embodiments, a high voltage generator system is provided that includes a voltage source and an active resonant interposer circuit connected to the voltage source. The active resonant interposer circuit includes a one or more switching modules configured to output two different voltage levels using resonant switching, wherein discharged energy is stored and reused during the resonant switching cycles, and the resonant switching modules are rechargeable at the two different voltage levels.

In accordance with yet other various embodiments, a method for controlling voltage switching is provided. The method includes configuring a plurality of switching devices to switch states during resonance operation and providing a capacitor (e.g., energy-storage capacitor) to store discharged energy during a resonant cycle of the resonance operation and being rechargeable in each of the states.

DETAILED DESCRIPTION OF THE INVENTION

Figure 1:
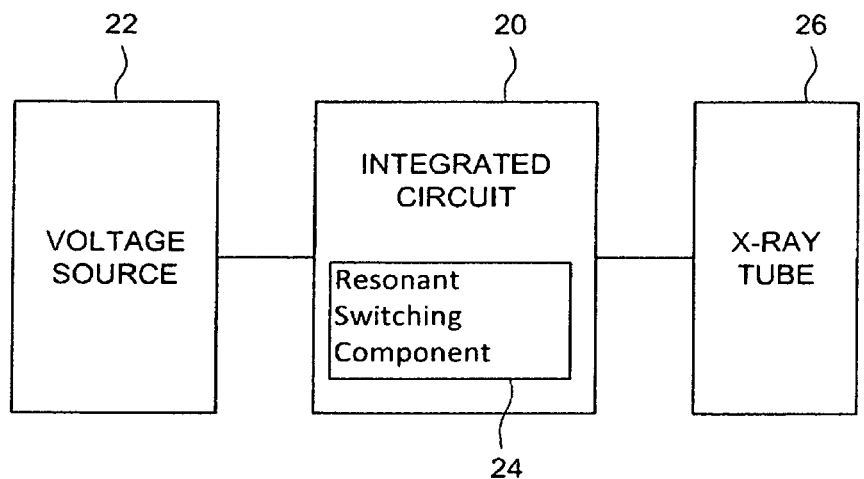
FIG. 1 is a simplified block diagram of a switching architecture having an interposer circuit according to an embodiment of the invention.

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

The various embodiments are described herein within a particular operating environment including a particular imaging system, such as a "third generation" computed tomography (CT) system (e.g., a sixty-four-slice CT system). It should be appreciated by one skilled in the art that embodiments of the invention are equally applicable for use with other configurations and systems, such as luggage screening systems. Furthermore, the embodiments are applicable to x-ray radiographic imaging systems as well as x-ray tomosynthesis imaging systems. Additionally, embodiments of the invention will be described with respect to the detection and conversion of x-rays. However, one skilled in the art will further appreciate that embodiments of the invention are equally applicable for the detection and conversion of other high frequency electromagnetic energy. Also, the x-ray tube and detector are described to rotate around the object being imaged, but alternate configurations wherein the detector and x-ray source are held stationary and the object is rotated are also contemplated, such as is used for industrial non-destructive testing purposes. Hence, although discussed in the context of CT systems, the various embodiments may be applied to projection x-ray imaging used in other medical and industrial radiographic applications as well.

Various embodiments provide a switching architecture including an active resonant interposer circuit configured to switch or assist in switching between a first voltage level and a second voltage level. For example, the various embodiments provide switching between a low kilovolt (kV) level, applied by a generator, to a high kV level with a stable voltage during the scanning integration periods. The interposer circuit provides resonant switching with energy recovery such that the energy used going from a high kV level is recovered when returning to a low kV level, then reused again and recirculated when going from the low kV level to the high kV level. Additionally, the various embodiments can provide a voltage waveform with variable frequency and duty cycle, including a constant voltage level high or low. By practicing various embodiments, fast switching between the first voltage level and the second voltage level (e.g., high and low voltage levels) is achieved. The embodiments enable improved separation in the mean energy of applied x-ray spectra, thereby improving material decomposition and effective atomic number estimation of a scanned object. Additionally, the various embodiments may be implemented in systems where the voltage to be switched is very large (e.g., 200 kV or greater), the parasitic capacitances to ground are also very large, or the energy required by the load is relatively small, as is the case for industrial inspection systems utilizing stationary anode x-ray tube technology. Additionally, because of the resonant transitions, the described embodiments may reduce electromagnetic interference (EMI).

As illustrated in FIG. 1, a switching architecture in one embodiment includes an active resonant interposer circuit 20 (hereafter referred to as the interposer circuit 20) connected to a voltage source 22 (e.g., a high voltage generator) and an x-ray tube 26. The interposer circuit 20, which may be configured as an active resonant module, includes resonant switching component(s) 24 that facilitate switching of the voltage generated from the voltage source 22 and applied to an x-ray tube 26. For example, in operation, the interposer circuit 20 with the resonant switching component 24 provides switching between a high kV level (e.g., 140 kV) and a low kV level (e.g., 80 kV) during resonance. However, it should be noted that other high and low voltage levels may be provided and the various embodiments are not limited to a particular voltage level. As another example, the high kV level can range from a few tens of kV (e.g., ~30 kV for mammography) to hundreds of kV (e.g., ~450 kV for industrial inspection applications). The energy is reused and recirculated when switching between the voltage levels energy, which saves the energy and allows faster switching. In some embodiments, switching between the voltage levels is provided in about 10-100 microseconds or less.

Figure 2:
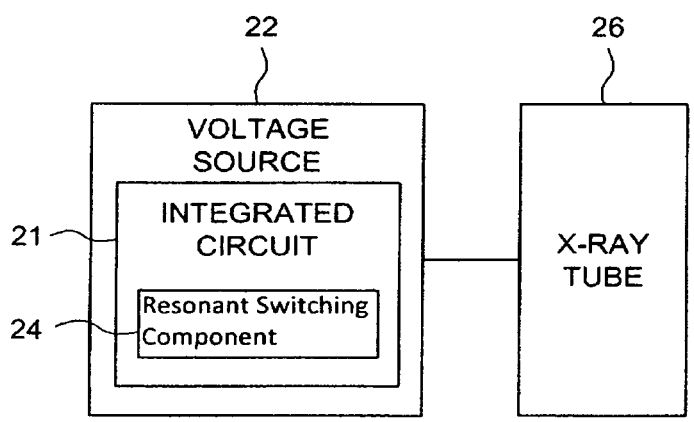
FIG. 2 is a simplified block diagram of another switching architecture having an integrated interposer circuit according to an embodiment of the invention.

The embodiment illustrated in FIG. 1 includes the interposer circuit 20 connected to the voltage source 22, such as in an add-on configuration. The various embodiments are not limited to such a configuration and switching architecture. For example, as illustrated in FIG. 2, the interposer circuit 20 may be integrated with or form part of the voltage source 22 and is illustrated as an integrated circuit 21 in the embodiment. In the active resonant configuration of the various embodiments, the electronics in the system can transit power to the x-ray tube 26, for example, to charge or continue to provide power to the load (e.g., vacuum tube) at high voltage operation. For example, in the embodiment of FIG. 1, energy is provided by the voltage source 22 at 80 kV and energy is provided to the x-ray tube 26 at 140 kV by both the voltage source 22 and the interposer 20. Different configurations of the various embodiments will now be described in more detail below.

Figure 3:
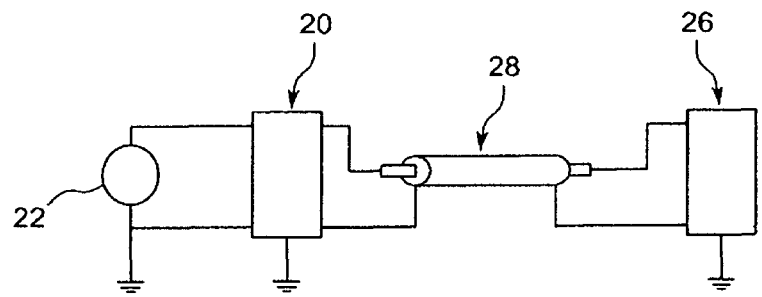
FIG. 3 is a block diagram showing a connection arrangement for an interposer circuit according to an embodiment of the invention.
Figure 4:
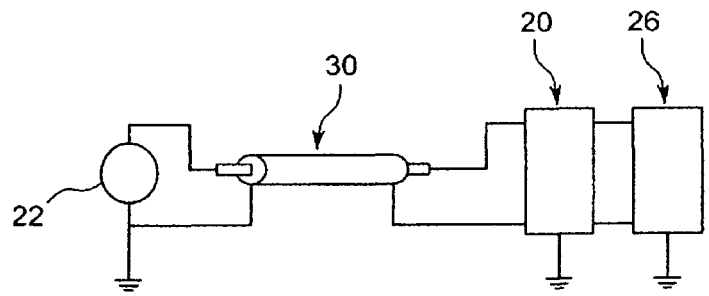
FIG. 4 is a block diagram showing a connection arrangement for an interposer circuit according to another embodiment of the invention.
Figure 5:
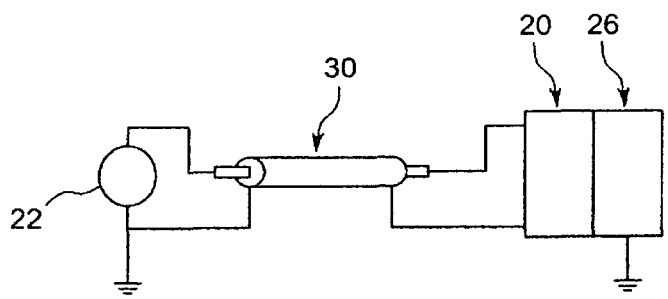
FIG. 5 is a block diagram showing a connection arrangement for an interposer circuit according to another embodiment of the invention.

As illustrated in FIGS. 3 through 5, the interposer circuit 20 may be connected in different configurations. The particular configuration selected may be based on the arrangement of the x-ray system in connection with which voltage switching is implemented. FIG. 3 illustrates an embodiment wherein the interposer circuit 20 is provided in proximity and connected to the voltage source 22 and connected to the x-ray tube via a length of cable 28. It should be noted that a cable (not shown) is also provided to connect the interposer circuit 20 to the voltage source 22, which in this embodiment is shorter than the cable 28. The cable 28 connecting the interposer circuit is rated for a higher voltage operation than the cable 30 illustrated in FIGS. 4 and 5. For example, the cable 28 in this embodiment is rated at the higher voltage level, such as 140 kV.

FIG. 4 illustrates the interposer circuit 20 in proximity and connected to the x-ray tube 26. In this embodiment, a length of cable 30 connects the interposer circuit 20 and the voltage source, such that the cable 30 is rated for a lower voltage operation than the cable 28 shown in FIG. 3, for example, 80 kV. The interposer circuit 20 also may be coupled directly to the x-ray tube 26, for example, by bolting the two components together, as shown in FIG. 5. However, in all three of the embodiments illustrated in FIGS. 3 through 5, the interposer circuit 20 is a separate unit connected to the system. It should be noted that the cable 28 or 30 is generally a high-voltage cable.

Figure 6:
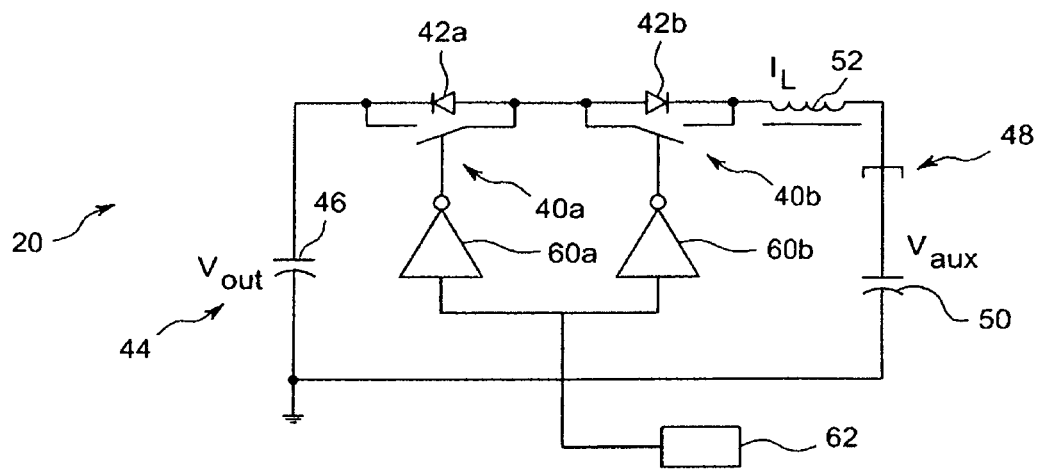
FIG. 6 is a simplified circuit schematic diagram illustrating operation of various embodiments of the invention.

The embodiments illustrated in FIGS. 3 through 5 are an active configuration. Accordingly, the system is capable of providing energy and power at both voltage levels. Accordingly, the voltage source 22 is a high voltage generator capable of generating voltages corresponding to low levels, for example, 80 kV, and the interposer 20 with the voltage source 22 provides the extra energy/power needed to operate the load (e.g., vacuum chamber) at a high voltage level, for example, 140 kV. A simplified schematic diagram of one of the modules or stages 80 forming the interposer circuit 20 is shown in FIG. 6. The interposer circuit 20 operates to discharge energy from the system operating when switching from a high voltage level to a low voltage level, and restore the energy using energy reuse when transitioning to the next high voltage cycle. The switching of the interposer circuit 20 uses the reused energy that is resonantly discharged through an inductor and a capacitor instead of through the load to provide fast switching in various embodiments (e.g., 10-100 microseconds or less).

Specifically, the operation, including the working principle of various embodiments is illustrated in the schematic of FIG. 6. The schematic represented in FIG. 6 includes a plurality of switching devices 40a and 40b connected in series. The switching devices 40a and 40b may be any type of switches. For example, the switching devices 40a and 40b may be metal-oxide-semiconductor field-effect transistors (MOSFETs) or insulated gate bipolar transistors (IGBTs). As illustrated by the buffers 60a and 60b, the switching devices 40a and 40b are operated in opposite state with respect to one another. Accordingly, when a control signal from a driver 62 (e.g., a logic clock) is transmitted to the switching devices 40a and 40b, one of the switching devices 40a and 40b receives the opposite drive signal such that one of the switching devices 40a and 40b is in an open state and one of the switching devices 40a and 40b is in a closed state. In various embodiments, the switching devices 40a and 40b are connected in a common source/emitter configuration to allow control by a single control line from the driver 62.

Each of the switching devices 40a and 40b is connected in parallel with a diode 42a and 42b, respectively, that operates as a blocking diode. The switching devices 40a and 40b are connected between a main or system capacitor 46 and an auxiliary capacitor 50. An inductor 52 is also connected in series between the capacitor 50 and the diode 40b. It should be noted that the inductor 52 also might be referred to as a resonant inductor.

The principle of operation, as described in more detail below, is such that energy is resonantly transferred from one capacitor to another capacitor, for example from capacitor 46 to capacitor 50, and vice versa. The switching speed of the transition between voltage levels is controlled by the inductor 52, and the capacitors 46 and 50. The inductor 52, and the capacitors 46 and 50 operate as resonant elements. In practice, and in some embodiments, the values of the capacitors 46 and 50 are set by the geometrical size of the connecting cable and vacuum tube, therefore the switching speed from one voltage level to another, is determined by the value of the inductor 52. For example, the smaller the value of the inductor 52, the faster the transition of the switching between high to low voltage, and vice versa. The transition speed of the devices 40a and 40b (in opening or closing) in various embodiments is much faster than the voltage transition speed.

As an example, when the voltage across the main capacitor 46 ($V_{out}$) is a high voltage level, the switching device 40a is in an open state and the switching device 40b is in a closed state. In this high voltage state, energy transfer from the main capacitor 46 to the auxiliary capacitor 50 occurs. The transition from the high voltage state to a low voltage state, wherein the output voltage 44 decreases from a high voltage level to zero voltage level, is accomplished by switching of the switching devices 40a and 40b. In particular, the switching device 40a switches from an open state to a closed state and the switching device 40b switches from a closed state to an open state. It should be noted that the switching of the switching devices 40a and 40b is provided in parallel based on the signal from the driver 62. The switching of the switching devices 40a and 40b causes the resonance state to start and the energy in the capacitor 46 is transferred to the capacitor 50, through the inductor 52, for storage until the next high-voltage state is desired. When high voltage is desired, a resonant energy transfer from the capacitor 50 to the capacitor 46, through resonant inductor 52, is restarted by opening the switching device 40a and closing the switching device 40b, such that the energy stored in the capacitor 50 is transferred to the capacitor 46.

Thus, the active resonant interposer circuit 20 can actively send or transmit energy/power to the load under any voltage condition, whether high or low. Thus, active operation can include recharging in both the high and low voltage states/levels.

Figure 7:
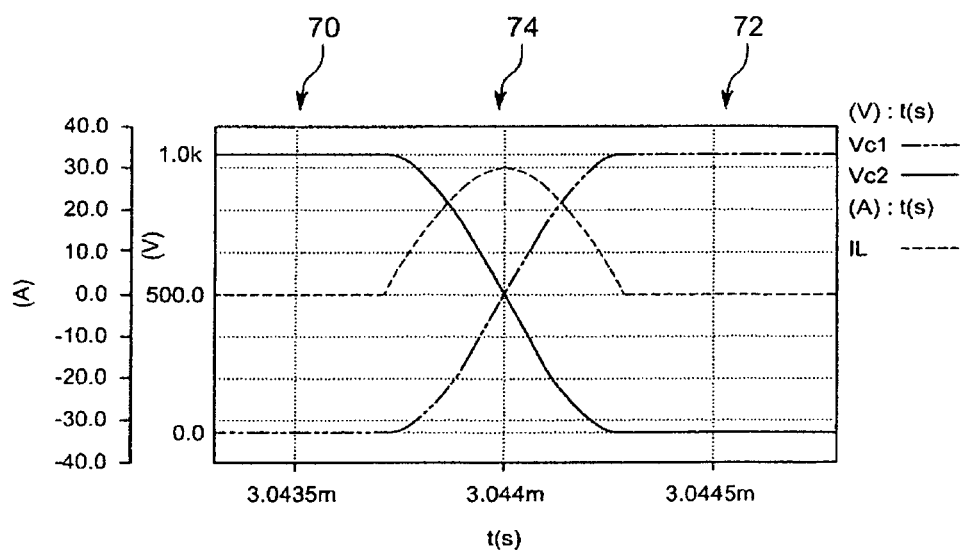
FIG. 7 is a graph of waveforms showing a low to high voltage operation of various embodiments.
Figure 8:
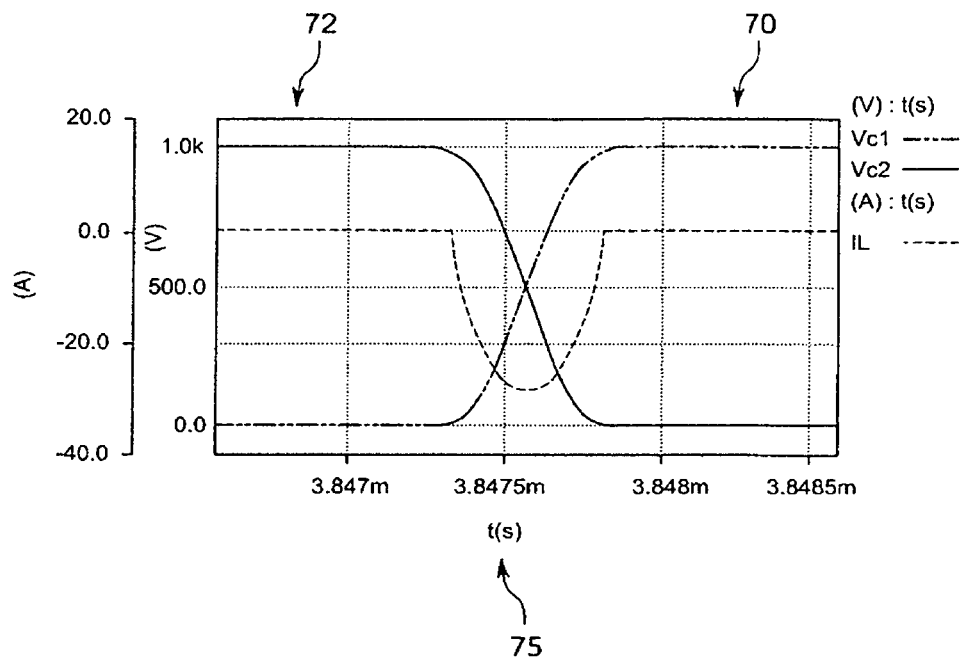
FIG. 8 is a graph of waveforms showing a high to low voltage operation of various embodiments.

FIGS. 7 and 8 are graphs illustrating waveforms of the voltage changes in the schematic circuit of FIG. 6 wherein the vertical axes represents the magnitude of the signal (e.g., voltage/current) and the horizontal axis represents time. In particular, the curve 70 represents the output voltage 44, the curve 72 represents the auxiliary voltage 48 and the curves 74 and 75 represent the current through the inductor 52. As demonstrated by the plots in FIG. 7, when the output voltage $V_{out}$ switches to the low voltage state, the energy is transferred from the capacitor 46 to the capacitor 50. As can be seen in FIG. 8, when the output voltage $V_{out}$ switches to the high voltage state, the energy stored in the capacitor 48 is reused and transferred back to the capacitor 46. Thus, an energy reuse scheme implements energy recovery such that the energy used to provide a high kV is recovered when returning to the low kV. The interposer circuit 20 (FIGS. 1, 3-5) operates such that energy transfer is provided during resonance.

Figure 9:
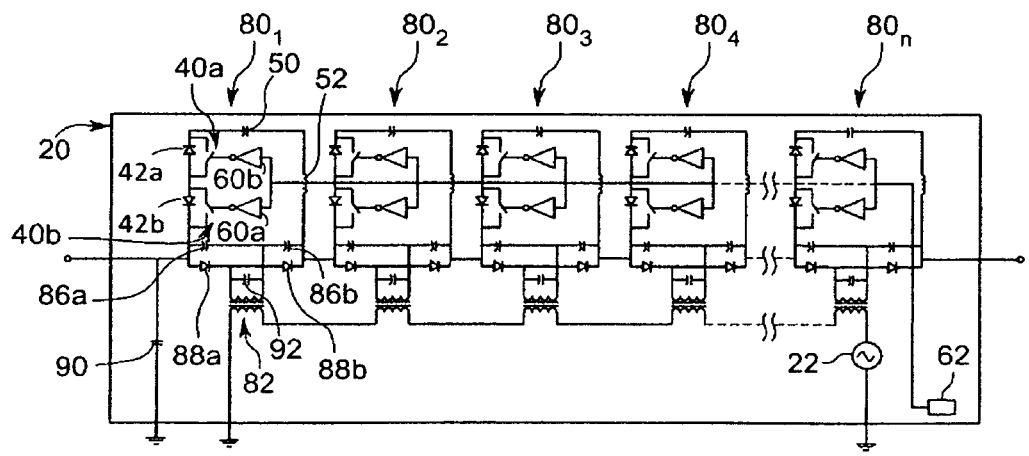
FIG. 9 is a schematic diagram the interposer circuit in accordance with an embodiment of the invention.
Figure 10:
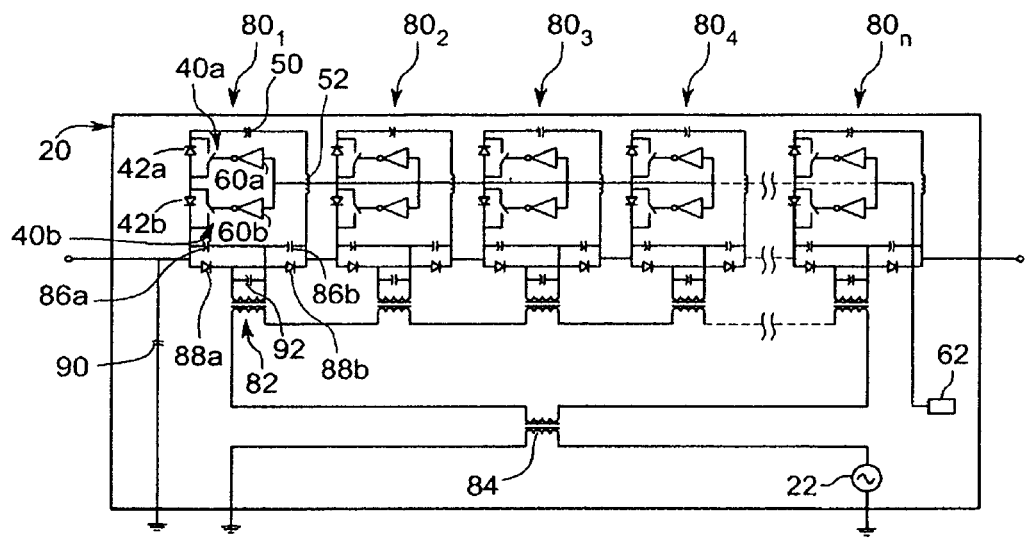
FIG. 10 is a schematic diagram of an interposer circuit in accordance with another embodiment of the invention.

The interposer circuit 20 is configured in an active mode as described herein and may include a plurality of switching stages, as well as several transformers and an additional power supply as illustrated in FIGS. 9 and 10. More particularly, a plurality of switching stages $80_1$ to $80_n$ may be provided, wherein like numeral represent like parts. It should be noted that each of the switching stages $80_1$ to $80_n$ include similar components and accordingly only the components in one of the switching stages are identified. It should be noted that the driver 62 drives all of the switching stages $80_1$ to $80_n$.

Figure 11:
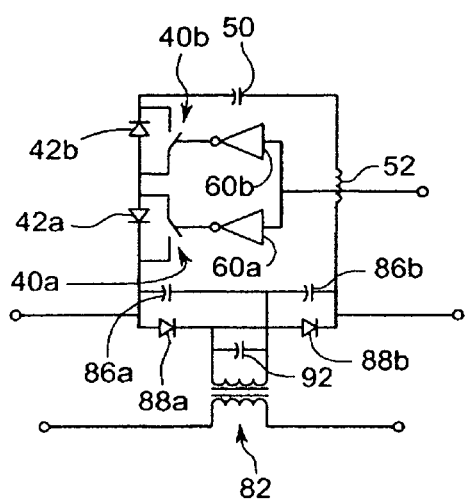
FIG. 11 is a schematic diagram of a module of the interposer circuits of FIGS. 9 and 10.

The interposer circuit 20 is formed by a plurality of switching stages 80. FIG. 11 represents the circuit schematic of each stage shown in FIG. 9 and FIG. 10. The stage represented in FIG. 11 includes a pair of capacitors 86a and 86b connected in parallel with a pair of blocking diodes 88a and 88b, respectively. This configuration may be referred to as a voltage doubler. The series connection of the capacitors 86a and 86b represent the main resonant capacitor (equivalent to capacitor 46 in FIG. 6). The stage in FIG. 11 includes two switching devices 40a and 40b, connected in series. The switching devices 40a and 40b may be any type of switches, such as a pair of transistors. For example, the switching devices 40a and 40b may be metal-oxide-semiconductor field-effect transistors (MOSFETs) or insulated gate bipolar transistors (IGBTs). Two diodes 42a and 42b are connected in parallel to the switching devices 40a and 40b. Finally, the stage in FIG. 11 includes a resonant inductor 52, and an auxiliary capacitor 50. This stage operates as previously described herein. In particular, the capacitor 50 (the auxiliary capacitor) operates to receive the energy from the discharging capacitors 86a and 86b, and keeps or stores the energy while the system is in the low voltage state, such that the energy may be reused in the transition to the high voltage state to recharge the capacitors 86a and 86b, as described in more detail herein, using the switching operation of the switching devices 40a and 40b. Thus, through the resonance cycle, the energy stored in the capacitor 50 is transferred back to the capacitors 86a and 86b when the system is in high voltage state. The capacitors 86a and 86b are maintained at a desired or required voltage by the secondary windings of the transformer 82.

The stage shown in FIG. 11 includes one rectifier circuit known as a doubler. The doubler includes the secondary transformer 82, the diodes 88a and 88b, and the capacitors 86a and 86b. It should be noted that this rectifier can be replaced by a common full bridge rectifier, where the two capacitors 86a and 86b are replaced by two diodes. Additionally the stage represented in FIG. 11 may include a transformer 82 with multiple secondary windings and a rectifying circuit connected to the secondary. All these rectifying circuits are connected in series and to one resonant circuit per transformer 82. For example, the stage may have a transformer 82 with three secondary windings, three rectifying circuits connected in series and one resonant circuit connected across all three rectifying circuits.

The configuration of FIGS. 9 and 10 each include a transformer 82 connected to each of the switching stages $80_1$ to $80_n$. The voltage source 22 (shown in FIGS. 9 and 10) is connected in parallel with the input capacitor 90. The additional energy and power necessary to sustain the high voltage during operation is provided through the transformers 82. FIGS. 9 and 10 show two different configurations to connect the transformers 82 to the additional power supply.

In particular, FIG. 9 shows an embodiment where the transformers 82 are connected in series and to the voltage source 22. In this configuration, the power is transmitted directly from the voltage source 22 to the secondaries of the transformers 82. FIG. 10 shows another embodiment of the active interposer. According to this embodiment, the voltage source 22 is connected to the transformers 82 by means of the transformer 84. This configuration is useful to decrease the isolation stress across the primary of the transformers 82.

In operation, when a high voltage output is desired, the transformer 82 operates to charge, and keep charged, the pair of series connected capacitors 86a and 86b through the diodes 88a and 88b. It should be noted that the capacitors 86a and 86b cannot be discharged through the diodes 88a and 88b. The active interposer configuration operates such that in a lower voltage state, a capacitor 90 (shown in FIGS. 9 and 10) is charged at a low voltage level, for example, 100 kV. In this low voltage level, the capacitors 86a and 86b are not charged. When at the high voltage level, the capacitors 86a and 86b are charged, for example, to 40 kV, such that the total output voltage is 140 kV. The series connected capacitors 86a and 86b are discharged, to transition the output voltage back to 100 kV, through a resonant cycle and the energy is transferred to the capacitor 50. The capacitor 50 (the auxiliary capacitor) operates to receive the energy from the discharging capacitors 86a and 86b, and stores the energy in the low voltage state, such that the energy may be reused in the transition to the high voltage state to recharge the capacitors 86a and 86b as described in more detail herein using the switching operation of the switching devices 40a and 40b. Thus, through the resonance cycle, the energy stored in the capacitor 50 is transferred back to the capacitors 86a and 86b. It should be noted that a capacitor 92 is also connected in parallel with each of the transformers 82, which operates as a smoothing capacitor.

Thus, the configurations shown in FIGS. 9 and 10 can be implemented in an existing system and provide efficient and fast switching between two voltages. For example, these embodiments may be added to a high voltage source, such as in a CT imaging system, a radiographic x-ray system, or a tomosynthesis x-ray system. The add-on configurations may be connected between the voltage source and the vacuum tube.

Figure 12:
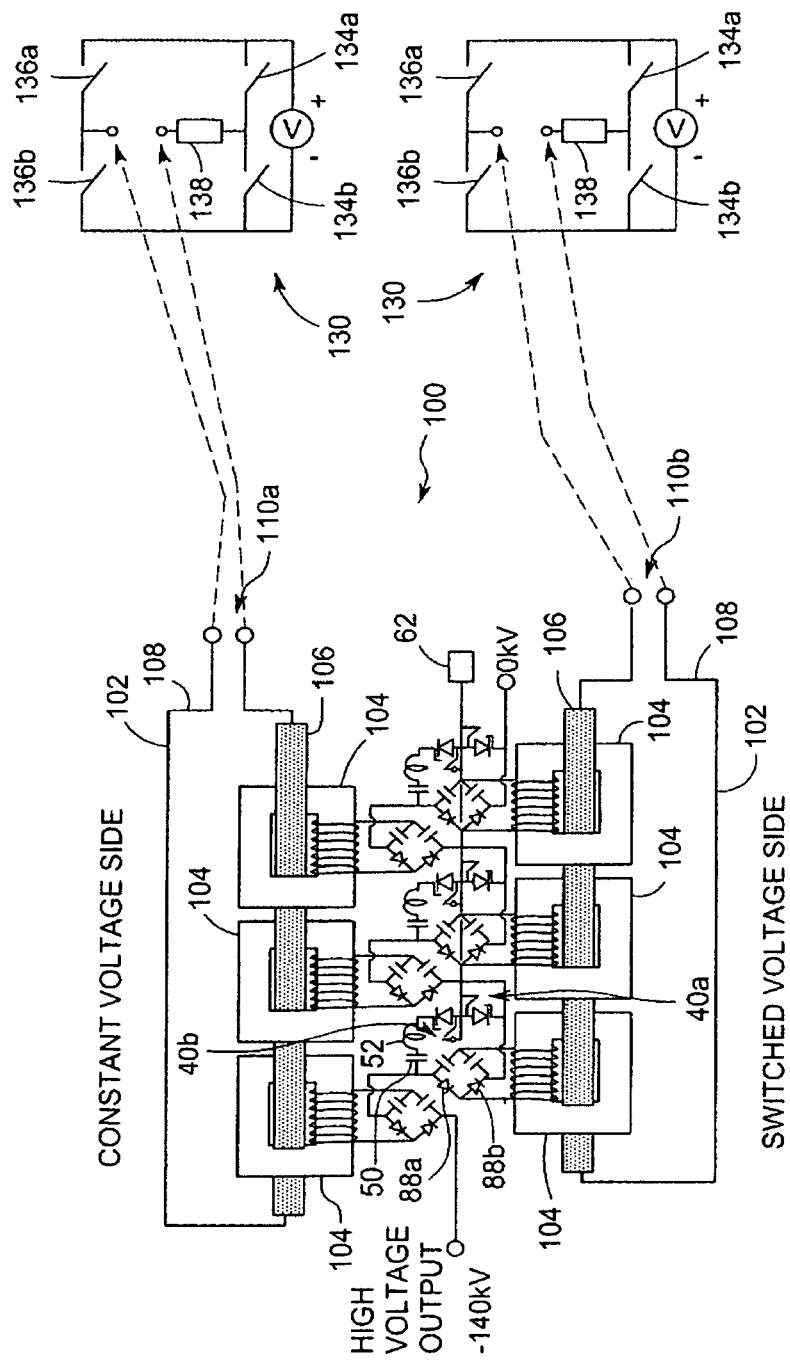
FIG. 12 is a block diagram illustrating an interposer circuit in accordance with another embodiment of the invention.

In other embodiments of an active configuration, the switching circuitry is integrated within the system, for example, integrated as part of the voltage source. For example, the switching circuitry may be integrated into a voltage source 22 having a transformer 100 (operating as a high voltage generator) with a primary winding 102 on each side as shown in FIG. 12. The transformer 100 includes a plurality of secondary windings 104 connected with each of the primary windings 102. The illustrated embodiment shows three secondary windings 104 connected with each of the primary windings 102. It should be noted that in the illustrated embodiment, the section 106 of the primary windings 102 is insulated, while the section 108 of the primary windings 102 may be not insulated. It also should be noted that additional transformers may be provided, for example, up to forty or more. This embodiment also includes two inverters 130 at the inputs 110a and 110b of the windings of the transformer 100 as described in more detail below.

The configuration of FIG. 12 is a mono-block configuration integrated with the voltage generator. For simplicity, the switching components for one set of windings are identified, with the other windings having similar components. As described in more detail herein, a pair of anti-parallel switching devices 40a and 40b (shown in FIG. 11) is provided per set of secondary windings 104. In operation, power is supplied to the input 110a to maintain a constant voltage, for example, 80 kV. The power supplied to the input 110b operates as a power backup to set the higher voltage level. For example, each of the secondary windings 104 may be powered to develop voltages of 20 kV such that the total output voltage, when added to the 80 kV (lower voltage level) at the input 110a is 140 kV (higher voltage level).

In operation, at the higher voltage level the capacitors 86a and 86b (shown in FIG. 11) are charged in each of the secondary windings 104. To provide faster switching to the lower voltage level, the capacitors 86a and 86b are discharged using resonance as described in more detail herein such that the energy is transferred and stored in the capacitor 50. The energy stored in the capacitor 50 then may be reused to recharge the capacitors 86a and 86b for the next high voltage cycle as described herein. The inductor 52, together with the capacitors 86a, 86b, and 50, determines the switching speed. Thus, the capacitors 86a and 86b when charged, provide 20 kV in a high voltage state and 0 kV during a low voltage state. Closing all the 40a switches and opening all the 40b switches trigger the resonance transition from high to low. Closing all the 40b switches and opening all the 40a switches trigger the resonance transition from low to high. The states are maintained by keeping the switches 40a and 40b in the proper position and providing adequate power to the inputs 110a and 110b.

Figure 17:
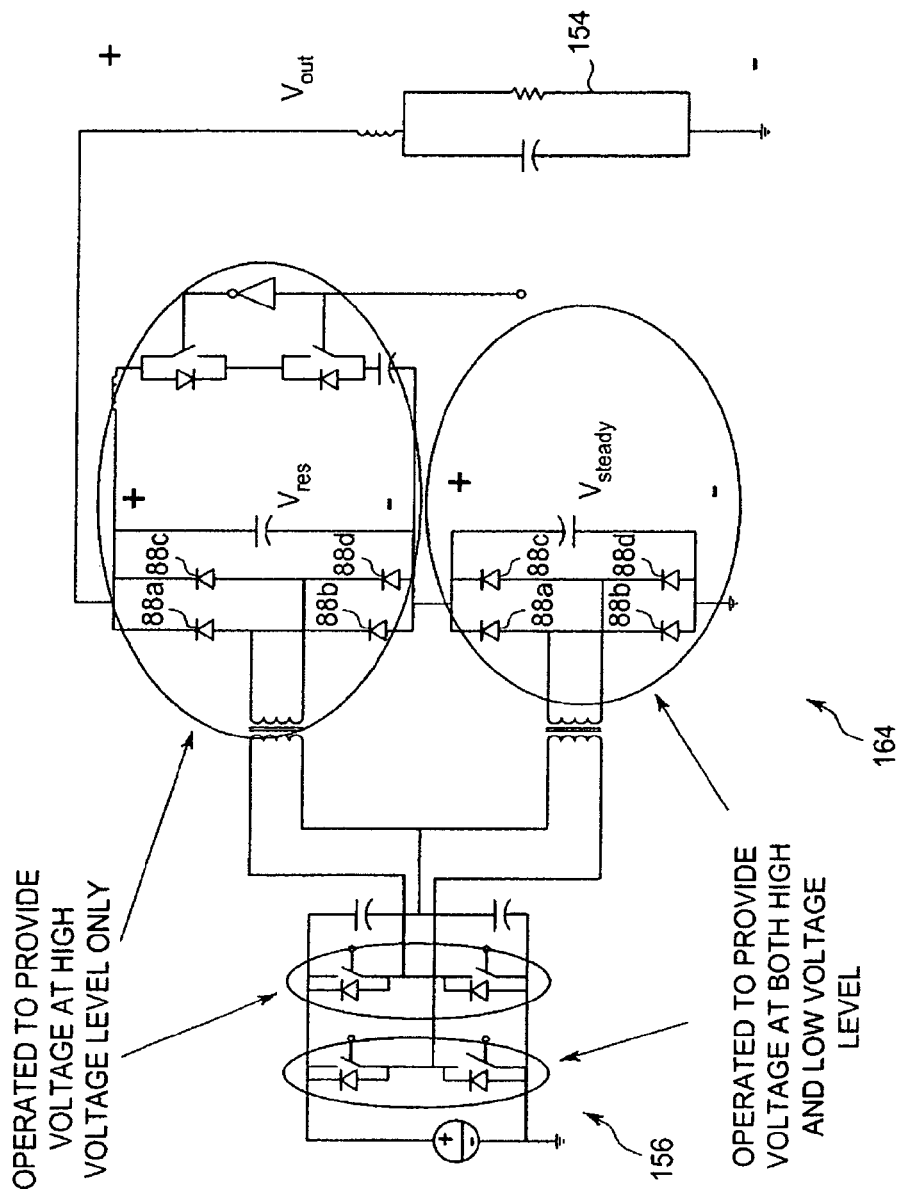
FIG. 17 is a schematic diagram of a bridge rectifier formed in accordance with various embodiments.

It should be noted that each transformer may have one or more secondary windings and each secondary windings is connected to a rectifying circuitry. For example, FIG. 13 includes an example of a module 101 with two windings on each secondary. The rectifying structure, may be a doubler or a simple full-bridge rectifier that utilizes four diodes, as illustrated in FIG. 17. A resonance circuitry structure is included and connected across all the secondaries of each transformer, with FIG. 13 showing this connection when two secondaries per transformer are provided.

Figure 13:
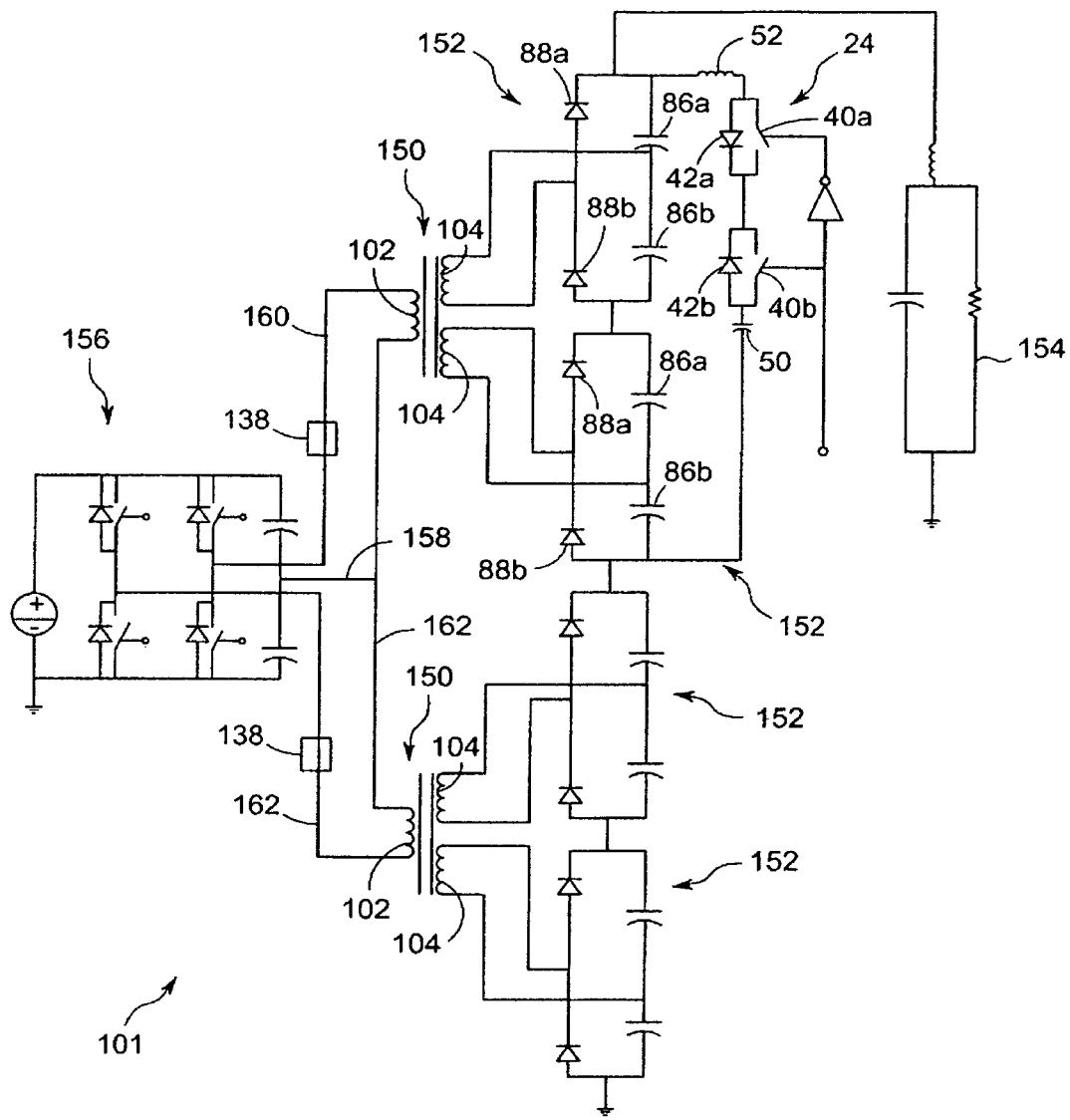
FIG. 13 is a schematic diagram of module formed in accordance with various embodiments.

Thus, as illustrated in FIG. 13, each module 101 includes a plurality of transformer structures, illustrated as two transformers 150. Each transformer includes a primary winding 102 and two secondary windings 104 per primary winding 102. Each of the secondary windings 104 is connected to a voltage doubler 152. Additionally, the secondary windings 104 (illustrated as the top secondary winding 104 in FIG. 13) of one transformer 150 only are connected to the resonant switching component 24. Thus, for each module 101, only one set of the secondary windings 104 is connected to the resonant circuit and is also connected to a load 154 (e.g., a vacuum tube represented using a lumped parameter model of a parallel resistor and capacitor in series with an inductor). A power inverter 156 is also provided and connected to each of the primary windings 102.

Figure 14:
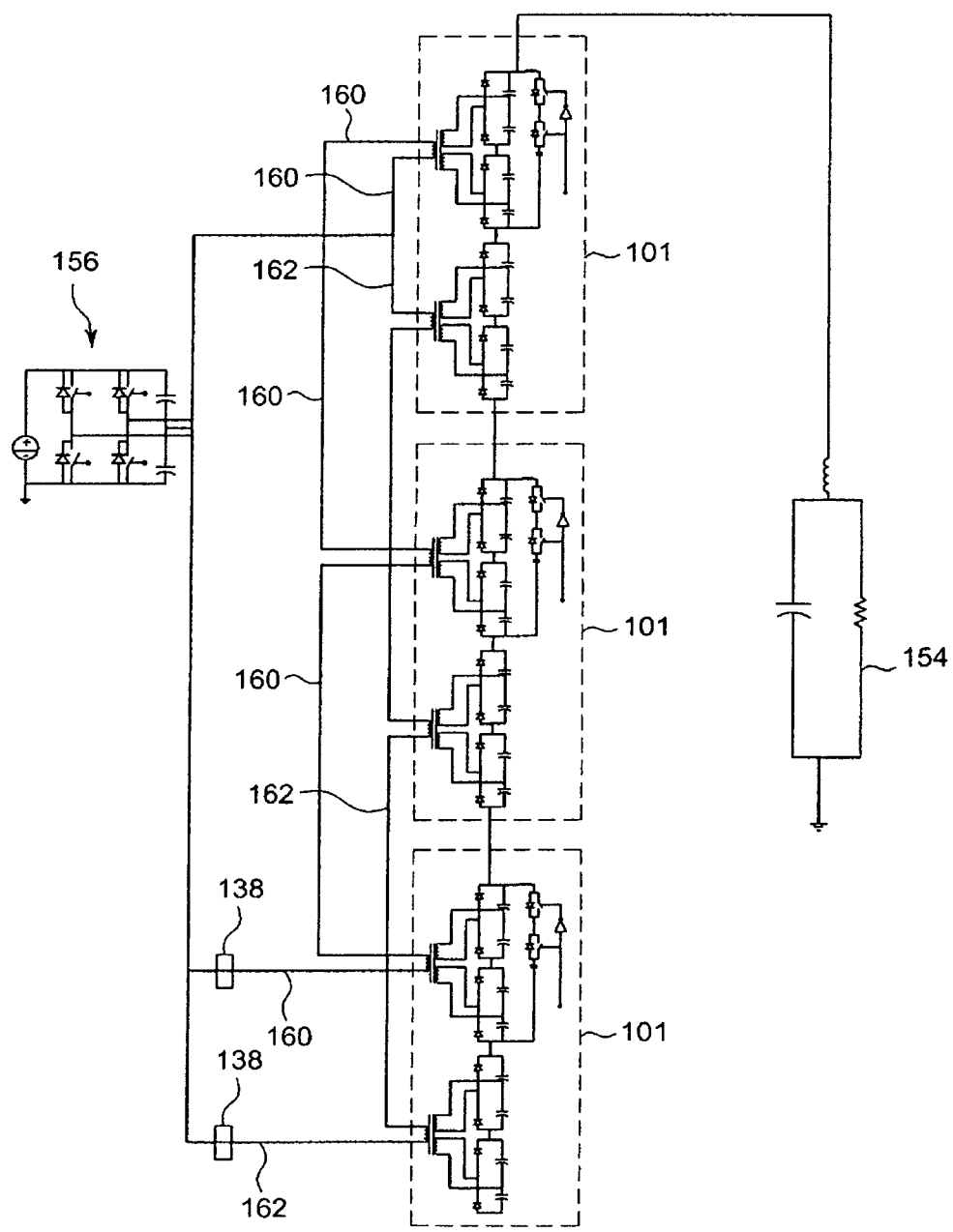
FIG. 14 is a schematic diagram of a plurality of modules formed in accordance with various embodiments.

Thus, as illustrated in FIG. 14, a plurality of modules 101 may be provided (e.g., 20 or more), with each module 101 configured as described in FIG. 13. It should be noted that a common line 158 splits from the power inverter 156 and is connected to each of the primary windings 102 of the top module (as shown in FIG. 13). After the split, each wire will always be connected to achieve the same functionality. For example wire 162 is always connected to the transformer 150 that have secondary windings 104 not connected to the resonant circuit (illustrated as the bottom secondary windings 104 in FIG. 13), and wire 160 is always connected to the transformer 150 that have secondary windings 104 connected to the resonant switching component 24. The lines 160 and 162, after having been connected to all the modules 101 in the stack, are also connected to the power inverter 156. These lines 158, 160 and 162 are also illustrated in FIG. 13.

Thus, in various embodiments, N number of modules 101 may be provided, where N is an integer value greater than 1. Additionally, it should be noted that although only two secondary windings 104 are shown in FIG. 13 in combination with each of the primary windings 102, additional secondary windings 104 may be provided, such as six secondary windings 104 per primary winding 102.

Figure 15:
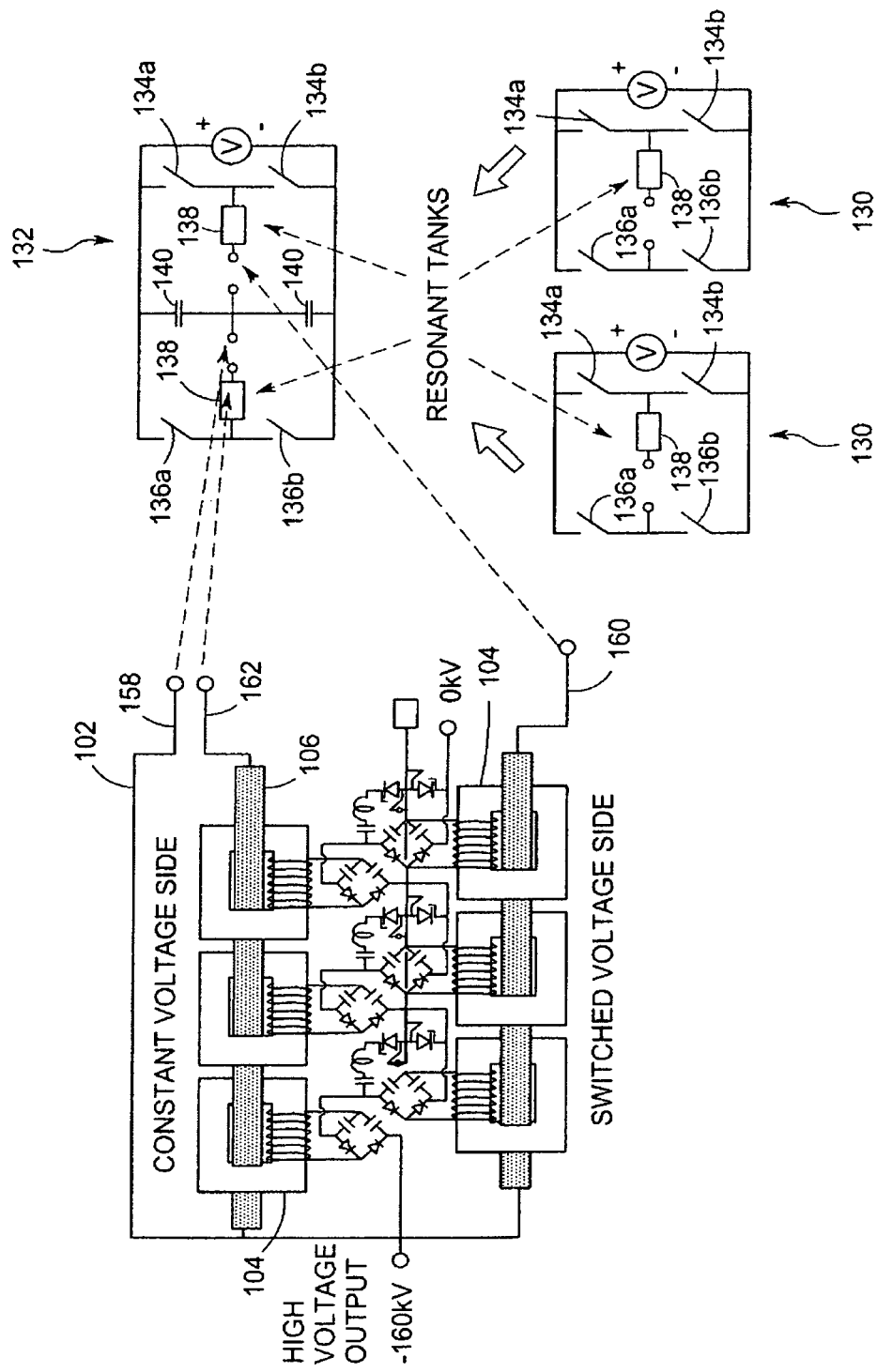
FIG. 15 is a block diagram illustrating an integrated inverter for the high voltage power source having an integrated interposer circuit shown in FIG. 13.

In some embodiments, as illustrated in FIG. 15, an integrated switching arrangement is provided with inverter integration. In particular, FIG. 15 illustrates the integration of two inverters 130 into a single inverter 132. As can be seen, pairs of switches 134a and 134b and 136a and 136b (which are also shown in FIG. 12) are combined into a single inverter having a resonant tank 138 for each of the inverters 130 connected at the midpoint of the series connected capacitors 140. The capacitors 140 provide a midpoint voltage level. Accordingly, the common wire 158 is connected to the midpoint provided by the capacitors 140 and the wires 160 and 162 are connected to a resonant tank 138 each (the resonant tanks are also shown in FIGS. 12-14). In operation, the system is hyper-resonant such that inverter 132 uses a resonator tank 138 formed from one inductor and one capacitor connected in series (the connection is included in the resonant tank 138 and is not shown). In this single integrated inverter 132 configuration, the inverter 132 provides one power unit instead of one-half a power unit. It should be noted that the inverter as described herein can be replaced by a hard switched inverter as well as a hypo-resonant inverter.

Figure 16:
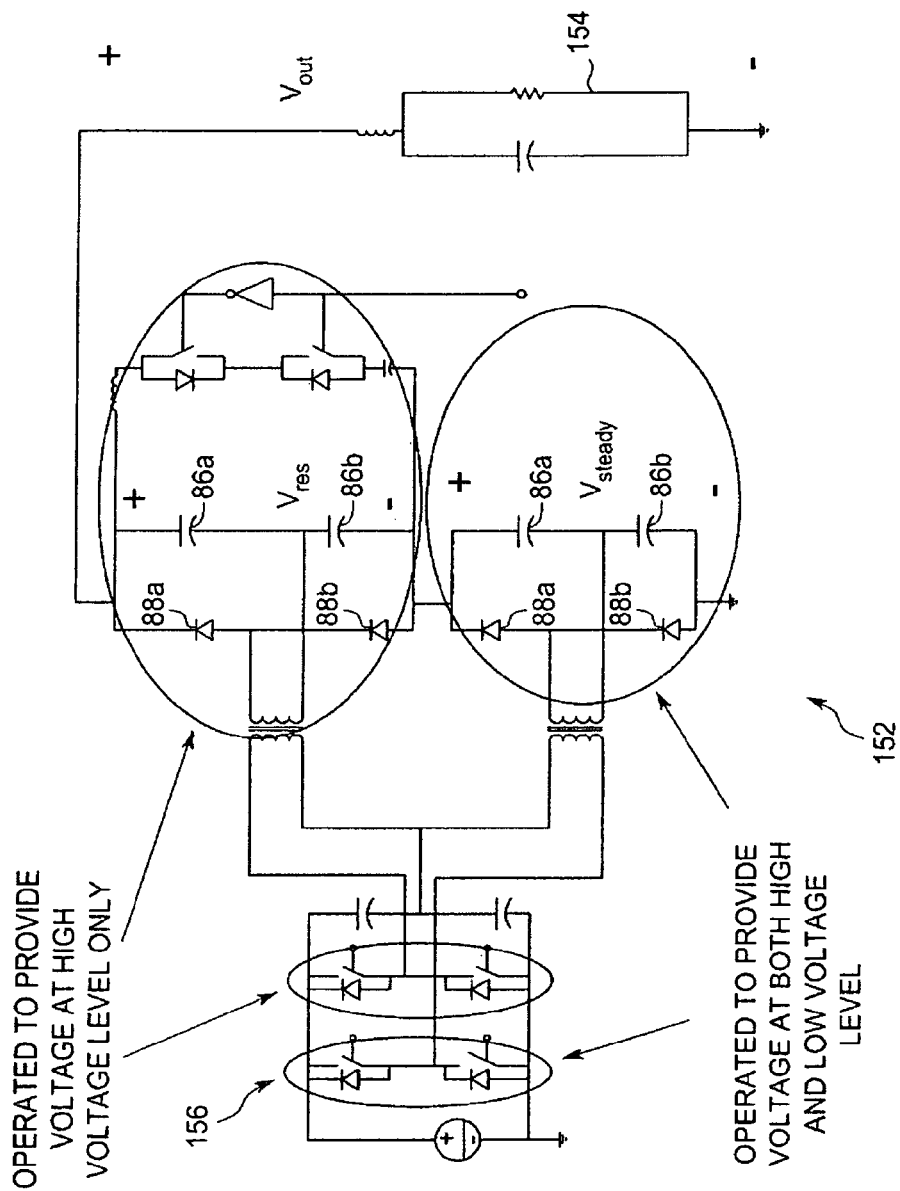
FIG. 16 is a schematic diagram of a voltage doubler formed in accordance with various embodiments.

It also should be noted that variations and modifications are contemplated. For example, any type of rectifier may be used in connection with the various embodiments. For example, instead of the voltage doubler 152 shown in FIG. 16, a bridge rectifier 164 may be provided as shown in FIG. 17. In the bridge rectifier 164, the capacitors 86a and 86b are replaced with diodes 88c and 88d.

Thus, various embodiments provide a switching architecture having an interposer providing switching using energy reuse. The transition between energy levels is provided during resonant operation.

Figure 18:
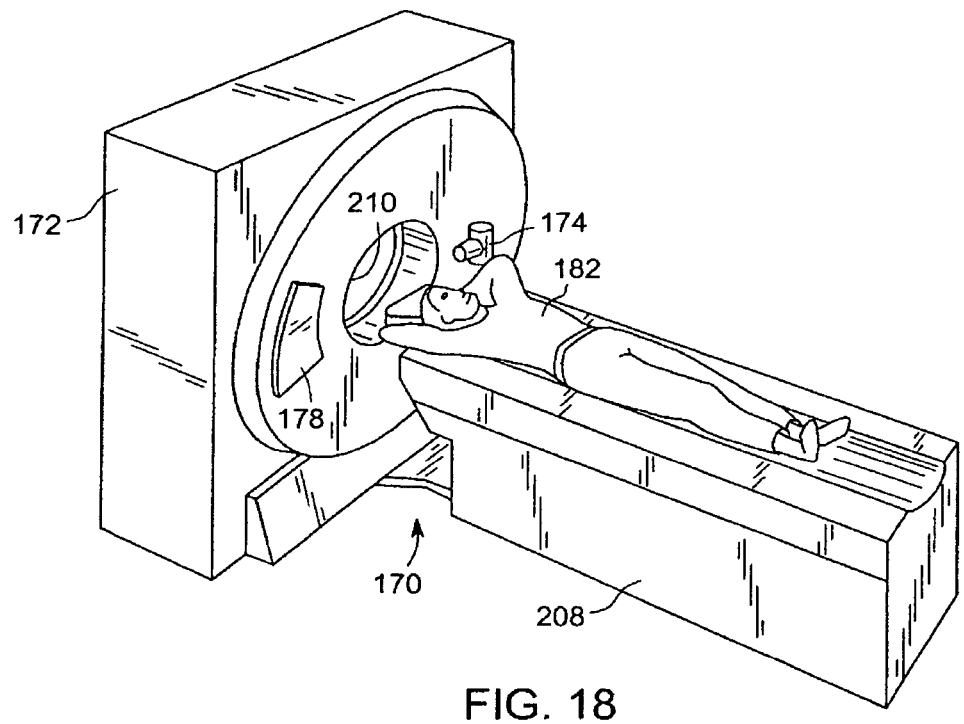
FIG. 18 is a pictorial view a computed tomography (CT) imaging system in connection with which various embodiments may be implemented.

The various embodiments may be implemented in different systems using high-voltage sources. For example, the various embodiments may be implemented in connection with a CT imaging system as shown in FIGS. 18 and 19, an x-ray imaging system as shown in FIG. 20, which may be a radiographic or x-ray tomosynthesis system.

Figure 19:
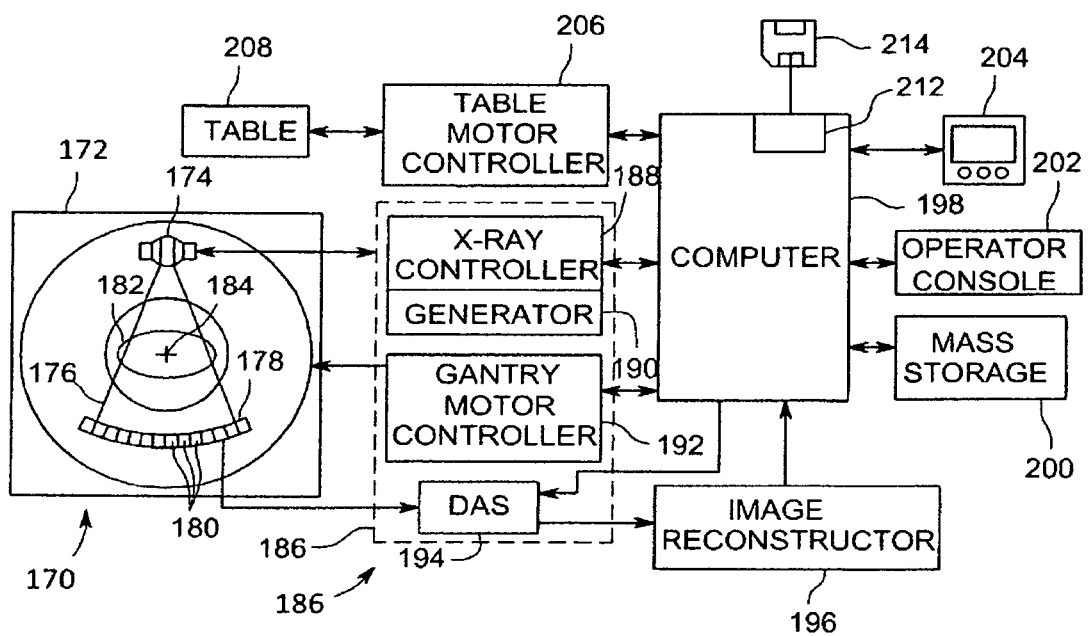
FIG. 19 is a block schematic diagram of the CT imaging system of FIG. 18.
Figure 20:
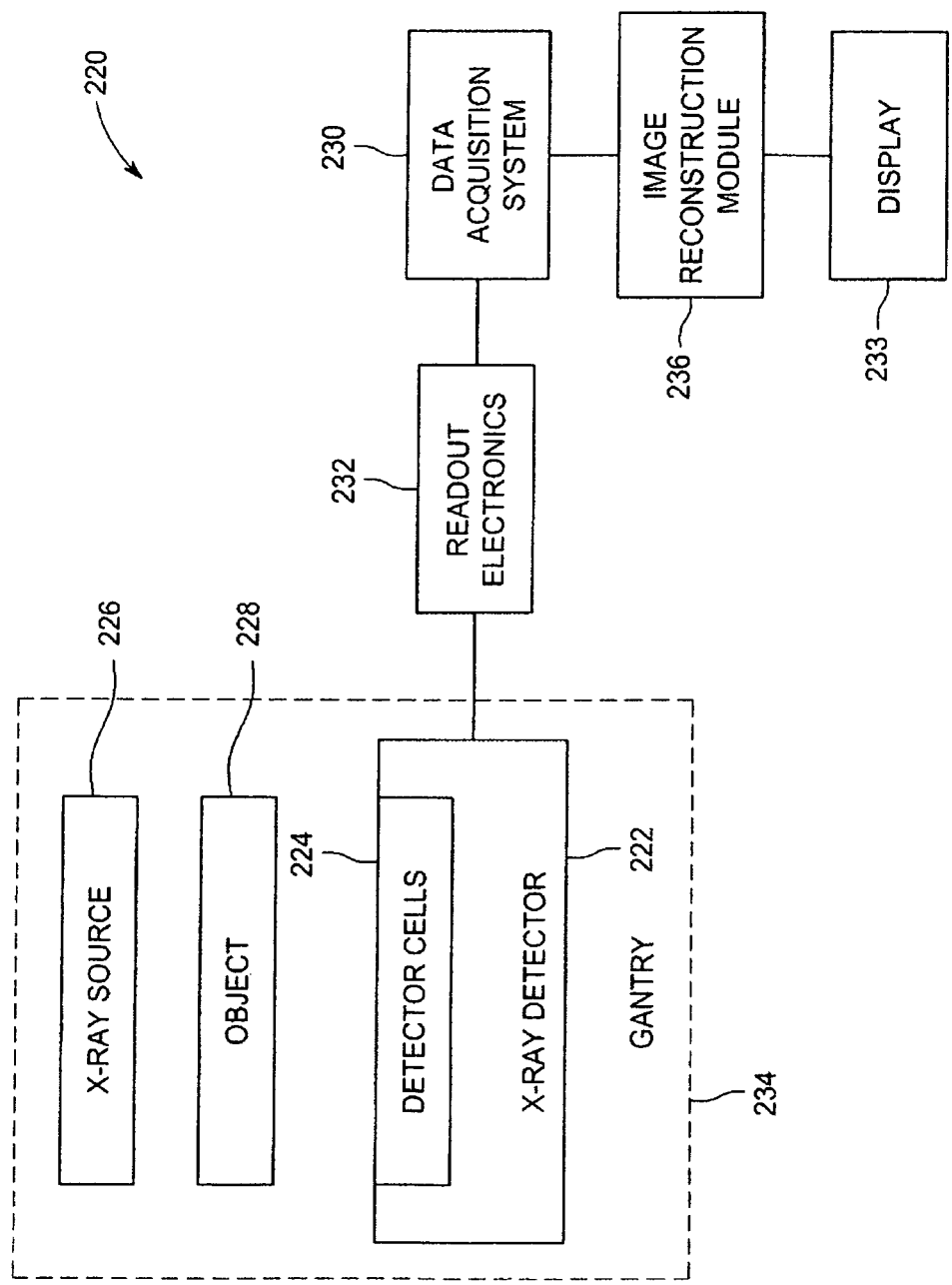
FIG. 20 is a schematic block diagram of an x-ray imaging system in connection with which various embodiments may be implemented.

In particular, FIG. 19 is a pictorial view of a CT imaging system 170. FIG. 20 is a block schematic diagram of the system 170 illustrated in FIG. 19. In the exemplary embodiment, the CT imaging system 170 is shown as including a gantry 172 representative of a "third generation" CT imaging system. The gantry 172 has an x-ray source 174 that projects a cone beam 176 of x-rays toward a detector array 178 on the opposite side of gantry 172.

The detector array 178 is formed by a plurality of detector rows (not shown) including a plurality of detector elements 180 that together sense the projected x-ray beams that pass through an object, such as a medical patient 182 or piece of luggage. Each detector element 180 produces an electrical signal that represents the intensity of an impinging x-ray radiation beam and hence is indicative of the attenuation of the beam as it passes through object or patient 182. A CT imaging system 170 having a multislice detector array 178 is capable of providing a plurality of images representative of a volume of object 182. Each image of the plurality of images corresponds to a separate "slice" of the volume. The "thickness" or aperture of the slice is dependent upon the height of the detector rows.

During a scan to acquire x-ray projection data, a rotating section within the gantry 172 and the components mounted thereon rotate about a center of rotation 184. FIG. 19 shows only a single row of detector elements 180 (i.e., a detector row). However, the multislice detector array 178 includes a plurality of parallel detector rows of detector elements 180 such that projection data corresponding to cone-beam geometry can be acquired simultaneously during a scan.

Rotation of components within the gantry 172 and the operation of the x-ray source 174 are governed by a control mechanism 186. The control mechanism 186 includes an x-ray controller 188 and generator 190 that provides power and timing signals to the x-ray source 174 and a gantry motor controller 192 that controls the rotational speed and position of rotating portion of gantry 172. A data acquisition system (DAS) 194 in the control mechanism 186 samples analog data from detector elements 180 and converts the data to digital signals for subsequent processing. An image reconstructor 196 receives sampled and digitized measurement data from the DAS 194 and performs high-speed image reconstruction. The reconstructed image is applied as an input to a computer 198 that stores the image in a mass storage device 200. Although shown as a separate device, image reconstructor 196 may be special hardware located inside computer 198 or software executing within computer 198.

The computer 198 also receives commands and scanning parameters from an operator via a console 202 that has a keyboard and/or other user input device(s). An associated display system 204 allows the operator to observe the reconstructed image and other data from the computer 198. The operator supplied commands and parameters are used by the computer 198 to provide control signals and information to the DAS 194, x-ray controller 188, generator 190 and gantry motor controller 192. In addition, the computer 198 operates a table motor controller 206 that controls a motorized table 208 to position the patient 182 in the gantry 172. The table 208 moves portions of the patient 182 through a gantry opening 210.

In one embodiment, the computer 198 includes a device 212, for example, a floppy disk drive, CD-ROM drive, DVD-ROM drive, or a solid state hard drive for reading instructions and/or data from a computer-readable medium 214, such as a floppy disk, CD-ROM, or DVD. It should be understood that other types of suitable computer-readable memory are recognized to exist (e.g., CD-RW and flash memory, to name just two), and that this description is not intended to exclude any of these. In another embodiment, the computer 198 executes instructions stored in firmware (not shown). Generally, a processor in at least one of the DAS 194, reconstructor 196, and computer 198 shown in FIG. 19 is programmed to execute control commands to perform switching as described in more detail herein. The switching is not limited to practice in the CT system 170 and can be utilized in connection with many other types and variations of imaging systems. In one embodiment, the computer 198 is programmed to perform different functions to switch the switching devices 40a and 40b described herein, accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits.

FIG. 20 illustrates an x-ray imaging system 220 in which various embodiments may be implemented. The imaging system 220 generally includes an x-ray detector 222 having an array of detector cells 224 defining a scan area, and an x-ray source 226. An object 228, such as a patient, is positioned between the x-ray source 226 and the x-ray detector 222, which may be one or more detectors or detector modules. However, the imaging system 220 may also scan other objects, such as in an industrial inspection application. The imaging system 220 also includes a data acquisition system 230 with readout electronics 232. Although shown separately in FIG. 20, the readout electronics 232 may reside within the x-ray detector 222 or the data acquisition system 230.

In one embodiment, the x-ray detector(s) 222 may be flat-panel detector systems such as an amorphous silicon flat panel detector or other type of digital x-ray image detector, such as a direct conversion detector as known to those skilled in the art. In another embodiment, the x-ray detector(s) 222 may include a scintillator having a screen that is positioned in front of the x-ray detector(s) 222.

It should be noted that the imaging system 220 may be implemented as a non-mobile or mobile imaging system. Moreover, the imaging system 220 may be provided in different configurations. For example, the image data may be generated with the x-ray source 226 positioned at discrete foci along an arc above the object to generate the image information using computed tomosynthesis procedures and processes (or may be in a radiographic configuration). In other embodiments, the x-ray source 226 and the x-ray detector 222 are both mounted at opposite ends of a gantry 234, which may be a C-arm that rotates about the object 228. The rotatable C-arm is a support structure that allows rotating the x-ray source 226 and the x-ray detector 222 around the object 228 along a substantially circular arc, to acquire a plurality of projection images of the object 228 at different angles (e.g., different views or projections) that are typically less than 360 degrees, but may comprise a full rotation in some circumstances.

In operation, the object 228 is positioned in the imaging system 220 for performing an imaging scan. For example, the x-ray source 226 may be positioned above, below or around the object 228. For example, the x-ray source 226 (and the x-ray detector(s) 222) may be moved between different positions around the object 228 using the gantry 234. X-rays are transmitted from the x-ray source 226 through the object 228 to the x-ray detector(s) 222, which detect x-rays impinging thereon.

The readout electronics 232 may include a reference and regulation board (RRB) or other data collection unit. The RRB may accommodate and connect data modules to transfer data (e.g., a plurality of views or projections) from the x-ray detector(s) 222 to the data acquisition system 230. Thus, the readout electronics 232 transmit the data from the x-ray detector(s) 222 to the data acquisition system 230. The data acquisition system 230 forms an image from the data and may store, display (on the display 233), and/or transmit the image. For example, the various embodiments may include an image reconstruction module 236, which may be implemented in hardware, software, or a combination thereof, that allows the data acquisition system to reconstruct images using x-ray data (e.g., radiographic or tomosynthesis data) acquired from the x-ray detector(s) 222 and as described in more detail herein.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A voltage switching system comprising:
a plurality of active resonant modules connected to provide a switching voltage output, the plurality of active resonant modules defining a plurality of switching stages, each active resonant module of the plurality of active resonant modules including:
a plurality of switching devices configured to operate in open and closed states to produce first and second voltage levels as outputs from a voltage input;
first and second capacitors connected to the plurality of switching devices, the first capacitor configured to receive a system discharge energy from the second capacitor during a resonant operating cycle when switching an output voltage from the first voltage level to the second voltage level, wherein the first capacitor is further configured to restore system energy to the second capacitor when switching from the second voltage level to the first voltage level; and
a resonant inductor connected in series between the first and second capacitors, the resonant inductor configured to transfer energy to and from the first and second capacitors.

2. The voltage switching system of claim 1, further comprising an x-ray tube connected to an output of the one or more active resonant modules and configured to provide two different energy spectra when powered by the first and second voltage levels.

3. The voltage switching system of claim 1, wherein the plurality of switching devices are connected in an anti-parallel configuration.

4. The voltage switching system of claim 1, wherein the resonant inductor is connected in series with the capacitor and configured to control a switching speed of the voltage level outputs.

5. The voltage switching system of claim 1, wherein the plurality of switching devices comprise transistors.

6. The voltage switching system of claim 1, wherein the first voltage level is higher than the second voltage level.

7. The voltage switching system of claim 1, wherein the plurality of switching devices is configured to recirculate the system energy stored in the capacitor during a next resonant operating cycle to switch an output voltage from the second voltage level to the first voltage level.

8. The voltage switching system of claim 1, further comprising an additional switching device and diode, wherein the additional switching device is connected in series with the switching devices and two of the switching devices are configured to be in a same state, which is different than a state of the other switching device.

9. The voltage switching system of claim 1, further comprising a power transformer and wherein the plurality of switching devices are connected to secondary windings of the power transformer.

10. The voltage switching system of claim 9, wherein the transformer comprises two primary windings.

11. The voltage switching system of claim 10, further comprising a single inverter connected to the two primary windings.

12. A high voltage generator system comprising:
a voltage source; and
an active resonant circuit connected to the voltage source, the active resonant circuit including a plurality of resonant switching modules configured to output two different voltage levels using resonant switching of a plurality of switching devices in each resonant switching module of the plurality of resonant switching modules, wherein discharged energy is stored and reused during resonant switching cycles, and the plurality of resonant switching modules being rechargeable to operate at the two different voltage levels.

13. The high voltage generator system of claim 12, further comprising an x-ray tube connected to an output of the active resonant circuit and configured to provide two different energy levels when powered by the two different voltage levels.

14. The high voltage generator system of claim 13, wherein the active resonant circuit is integrated with the x-ray tube.

15. The high voltage generator system of claim 13, wherein the active resonant circuit comprises switching devices configured to switch an output between the voltage levels, wherein a switching time for the switching is about 10-100 microseconds or less and further comprising an inductor connected in series with the switching devices to control the switching time.

16. The high voltage generator system of claim 12, further comprising an active resonant interposer circuit and wherein each of the plurality of resonant switching modules comprises a capacitor and the active resonant interposer circuit is configured for active operation such that the capacitor of each of the plurality of resonant switching modules is rechargeable at one or both of a high voltage level and a low voltage level.

17. The high voltage generator system of claim 12, wherein the active resonant circuit is a separate unit being an interposer circuit, the interposer circuit being separate from and coupled to the voltage source.

18. The high voltage generator system of claim 12, wherein the active resonant circuit is integrated with the voltage source.

19. A method for controlling voltage switching, the method comprising:
configuring a plurality of active resonant modules to use a plurality of switching devices in each of the active resonant modules of the plurality of active resonant modules to switch between states during resonance operation;
providing first and second capacitors to store discharged energy during a resonant cycle of the resonance operation and being rechargeable in each of the states, wherein the first capacitor is configured to receive a system discharge energy from the second capacitor during a resonant cycle when switching an output voltage from a first voltage level to a second voltage level, the first capacitor further configured to restore system energy to the second capacitor when switching from the second voltage level to the first voltage level; and providing a resonant inductor connected in series between the first and the second capacitors, the resonant inductor configured to transfer energy to and from the first and the second capacitors.

20. The method of claim 19, further comprising configuring the plurality of switching devices to recirculate the stored energy during another resonant cycle of the resonance operation.

* * * * *